US006798635B2

(12) United States Patent
Olsson

(10) Patent No.: US 6,798,635 B2
(45) Date of Patent: Sep. 28, 2004

(54) METHOD AND ARRANGEMENT FOR DETERMINING THE POSITION OF AN ELECTROMAGNETIC ACTUATOR

(75) Inventor: Johan Olsson, Åmål (SE)

(73) Assignee: Swedish Control Systems Aktiebolag, Åmål (SE)

( * ) Notice: Subject to any disclaimer, the term of this patent is extended or adjusted under 35 U.S.C. 154(b) by 323 days.

(21) Appl. No.: 09/919,689

(22) Filed: Jul. 30, 2001

(65) Prior Publication Data

US 2002/0050898 A1 May 2, 2002

(30) Foreign Application Priority Data

Jul. 28, 2000 (SE) .............................................. 0002796

(51) Int. Cl.[7] ........................... H01H 47/00; G01B 7/14

(52) U.S. Cl. ................................... 361/160; 324/207.16

(58) Field of Search ..................... 324/207.16; 361/160, 361/161, 162, 103, 87, 140, 143, 152, 154, 182; 335/720, 221, 222

(56) References Cited

U.S. PATENT DOCUMENTS

| | | | | | |
|---|---|---|---|---|---|
| 5,481,187 | A | * | 1/1996 | Marcott et al. | 324/207.16 |
| 5,600,237 | A | * | 2/1997 | Nippert | 324/207.16 |
| 6,469,500 | B1 | * | 10/2002 | Schmitz et al. | 324/207.16 |

* cited by examiner

*Primary Examiner*—Jessica Han
(74) *Attorney, Agent, or Firm*—Jeffrey Pearce

(57) ABSTRACT

The invention relates to a method for driving and measuring the position of an electromagnetic actuator that operates according to the voice coil principle. The coil thus moves within a magnetized gap relative to permanent magnet core. As the coil extends partially outside of the core, its inductance will change. The voice coil is connected to a controllable current source that can both generate and control an average current and an AC component through the voice coil. The frequency of the AC component is measured, and is a function of the instantaneous inductance of coil, which in turn is a function of the coil's position relative to the core. In an alternative embodiment, the phase shift between an AC current and an AC voltage through the coil is analyzed to determine the position of the coil, while simultaneously controlling the force.

8 Claims, 2 Drawing Sheets

METHOD AND ARRANGEMENT FOR DETERMINING THE POSITION OF AN ELECTROMAGNETIC ACTUATOR

CROSS-REFERENCE TO RELATED APPLICATIONS

This application claims priority of Swedish Patent Application No. 0002796-1, which was filed on 28 Jul. 2000.

BACKGROUND OF THE INVENTION

1. Field of the Invention

This invention relates to a method and an arrangement for sensing the position of a linear electromagnetic actuator that operates according to the principle of a voice coil.

2. Description of the Related Art

It is known that one can measure the position of an electromagnetic actuator, in which the moving part comprises an iron core arranged so as to be influenced by the magnetic field generated by a stationary coil, by analyzing the inductance of the coil. One example of this method is shown in U.S. Pat. No. 5,172,298. An unavoidable disadvantage of this method is that the relative variation of inductance is low, which causes the absolute accuracy to be low as well. This is clearly a disadvantage if high precision is desired. In U.S. Pat. No. 5,172,298 it is also suggested that the coil may be divided into a driving coil and a measuring coil. This is an additional disadvantage, in that this leads to increased complexity.

In order to quickly position, for example, a hard disk pick-up, U.S. Pat. No. 4,937,510, discloses how one may use analog electronics to analyze the electromotive force (emf) that is induced by movement of the coil and therefrom to measure the coil's velocity. The absolute position is in this case controlled according to complicated principles and the measurement of velocity is intended to be used only by a velocity regulator that has a large bandwidth. The same type of velocity feedback has also been used to regulate the velocity of the coil in a loudspeaker; however, this often involves including a second, dedicated measuring coil in conjunction with the driving coil. Neither of these two methods is able to produce a value that indicates the absolute position of the actuator.

International Patent Application PCT/SE98/01564 (U.S. Pat. No. 6,246,563, issued 12 Jun. 2001) discloses how yet another actuator principle may be used to determine position by measuring variations in inductance, which are derived from the mutual inductance created by the transformer included in the disclosed type of actuator. The principle relies, however, on a complex structure with respect to both the driving of the actuator and to analysis of the position of the actuator, which in certain applications is undesirable.

SUMMARY OF THE INVENTION

The object of the invention is to solve the above-mentioned problems in order to achieve a rapid and accurate measurement of the position of the moving coil in a linear actuator based on the principle of a voice coil. This object is achieved by driving and measuring the position of an actuator, which has a gap that is magnetized by a permanent magnet, and in which gap a voice coil is arranged to move between two end positions, where the amount of core material that is surrounded by the voice coil varies as a function of position. The voice coil is connected to a controllable current source, so that the average current of the voice coil can be controlled. This in turn controls the actuator force. An alternating current component is then also included in the control current, by means of which the phase shift of the circuit can be measured. This phase shift then provides a measure of the position of the voice coil relative to the core material. One advantage of the invention is that it eliminates the need for end point breaker switches.

The invention makes possible the use of the voice coil principle in new applications. Characteristic of the principle of a voice coil is that it forms a quick, bidirectional, highly dynamic force source. When this principle is complemented with a simple and exact method for measuring position, new areas of application are created.

The position information that the invention generates may be used in any number of different contexts. One example is that actual position information can be used in any system that regulates the position of the actuator—regulators require some information about instantaneous position and this invention provides such information. For example, the invention may be used to generate position-feedback information in a position-regulated system. Yet another example are diagnostic functions for checking and analyzing the operation of the actuator itself.

The voice coil is driven by a current source that can in part control the average current through the voice coil and in part create an AC component. The average current provides for control of the force that the voice coil is to develop and the AC component provides an opportunity to analyze the inductance in the voice coil. The inductance of the voice coil can be caused to vary greatly as a function of position by allowing part of the voice coil to extend outside of the inner core when the voice coil is in its outermost position.

In the preferred embodiment of the invention, the current source comprises one or more switching elements that apply voltage to the voice coil in such a way that the instantaneous current value through the voice coil 3 oscillates between two controllable limiting values. The frequency of oscillation then becomes a measure of the position of the voice coil. A present position value of the voice coil is sensed and is coupled to a feedback position regulator that controls the average current through the voice coil.

In one optimized embodiment of the invention, the temperature in the voice coil is measured, from which a compensation factor is derived and used to compensate the measurement error that is caused by temperature changes in the voice coil.

DETAILED DESCRIPTION

Figure 1:
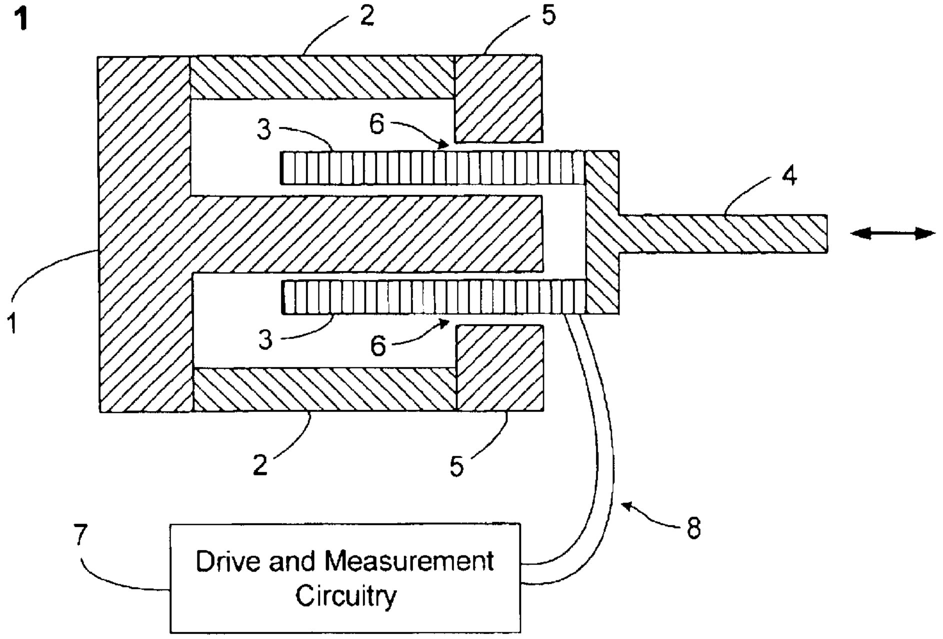
FIG. 1 shows a cross-section of an actuator that operates according to the voice coil principle.

FIG. 1 illustrates a cross-section of a cylindrical linear actuator that has a permanent magnet 2, an iron core 1, an outer ring 5 and a voice coil 3, which has an actuator arm portion 4 and is driven by a current source. The current source is included as part of drive and measurement circuitry 7, which is connected via conventional conductors 8 to the windings of the coil. An air gap 6 separates the voice coil 3 from the core 1. The voice coil 3 is able to move laterally (indicated by a double arrow), viewed as in the figure. When the voice coil 3 moves outward in the direction away from the iron core 1, its inductance will decrease correspondingly because the portion of the iron core 1 that is surrounded by the coil decreases.

If the relationship between the length of the air gap 6, of the stroke length of the coil, and the length of the coil (that is, the extent of its windings) is in the proportion 1:1:2, then the variation in coil inductance will approach 50%. Such a large variation provides good conditions for measuring inductance variations and therefrom determining the position of the coil with a high degree of accuracy. There is a trade-off between stroke length and efficiency, because an increased stroke length leads to an increased proportion of the coil that is no longer located in the air gap 6 and thus does not develop force to the same extent. A certain force will be generated because the magnetic flux density decreases gradually with increasing distance from the air gap 6.

Figure 2:
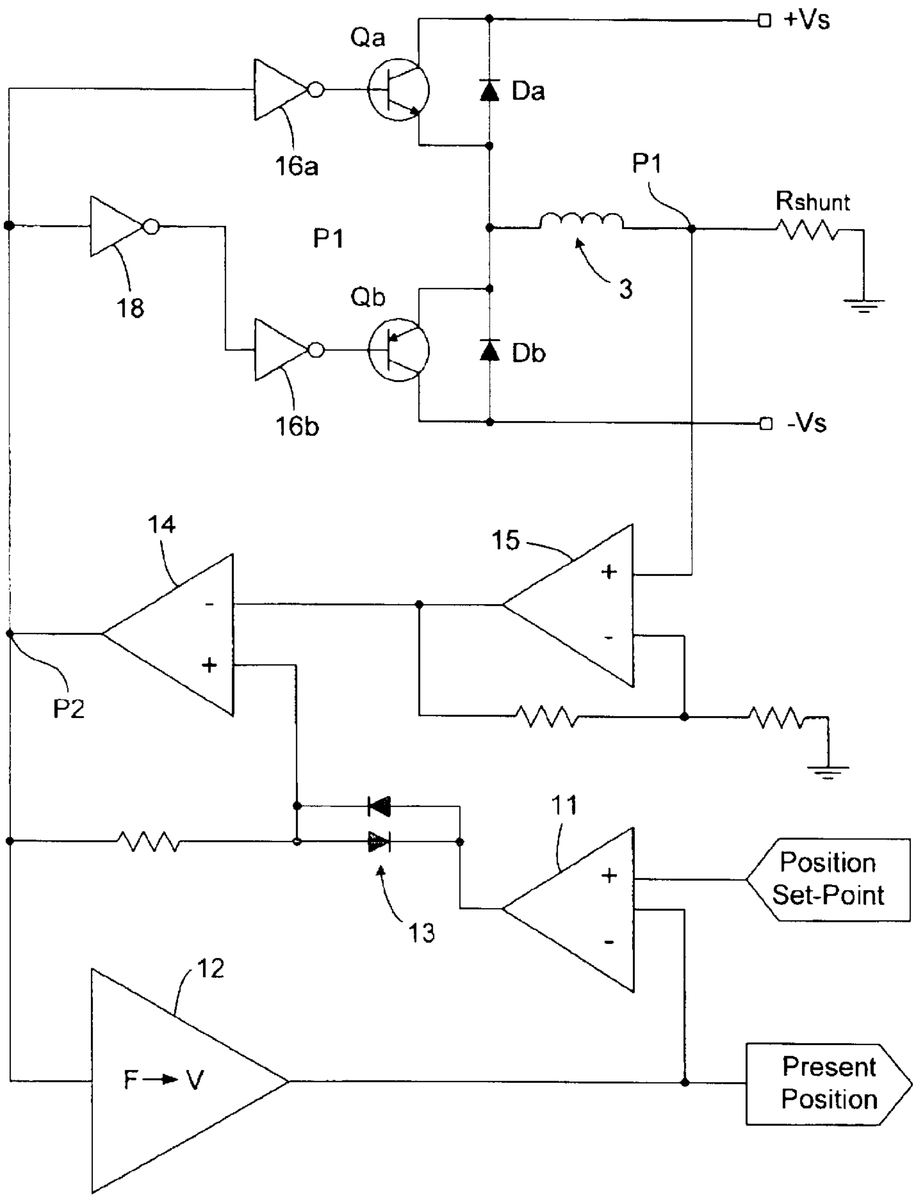
FIG. 2 is a circuit diagram that exemplifies the driving electronics used in the preferred embodiment of the invention.

FIG. 2 illustrates one embodiment of the method according to the invention, which is also included as part of the drive and measurement circuitry 7. In this embodiment, the voice coil 3 is driven by either a positive or a negative voltage (+Vs and −Vs, respectively) via two switching elements, in particular, transistors Qa, Qb, which are preferably provided with conventional respective freewheel diodes Da, Db. Regulation of the force occurs because the circuit oscillates between two current levels, which are represented as the Control signal in FIG. 3. The two current levels are determined by a comparator 14 and a hysteresis arrangement 13. In the illustrated preferred embodiment, the hysteresis arrangement 13 is formed by a parallel-connected pair 13 of oppositely biased diodes, which connect the output of a feedback regulator 11 with one input of the comparator 14.

The switching transistors Qa, Qb are driven by means of an inverter 18, together with transistor-driving stages 16*a*, 16*b*, which ensure that either the one or the other of the switching transistors Qa, Qb is conductive. The coil 3 is preferably connected to a system ground via a resistive shunt $R_{shunt}$. An input (preferably, the positive input, to preserve polarity) of an amplifier 15 is connected between the coil 3 and ground; in FIG. 3, this connection point is illustrated as point P1, which is also the point at which the coil current $I_{coil}$ is sensed. The amplifier 15 converts the coil current $I_{coil}$ into a corresponding voltage value and amplifies this voltage value—a conventional resistive net is shown in FIG. 2 connected to the amplifier 15 in order to scale the amplifier output as needed for subsequent comparison. The amplifier 15 is preferably of the type that has a very high input impedance, such as a standard operational amplifier, so that any loss of current through the coil caused by the amplifier will be negligible.

When the amplifier 15 output voltage exceeds the level that is set by the output voltage of the position regulator 11 plus the hysteresis of the comparator 14, then the positive driving transistor Qa is shut off and the negative driving transistor Qb is turned on; when the output voltage is less than the level from the position regulator minus the hysteresis of the comparator, then the negative transistor Qb is turned off and the positive transistor Qa is turned on.

The frequency with which the transistors Qa, Qb are switched depends in part on the hysteresis of the comparator 14, which is set by the diode pair 13 and is constant, and in part on the time derivative of the current $I^{coil}$ through the voice coil 3. The current $I_{coil}$ in turn is a function of the instantaneous coil inductance, which in turn depends on the position of the coil relative to the core 1. The switching frequency is thus a function of the position of the coil. This is illustrated in FIG. 3, which the shows the position lying farther from an origin position with increasing frequency of oscillation of the coil current $I_{coil}$.

Figure 3:
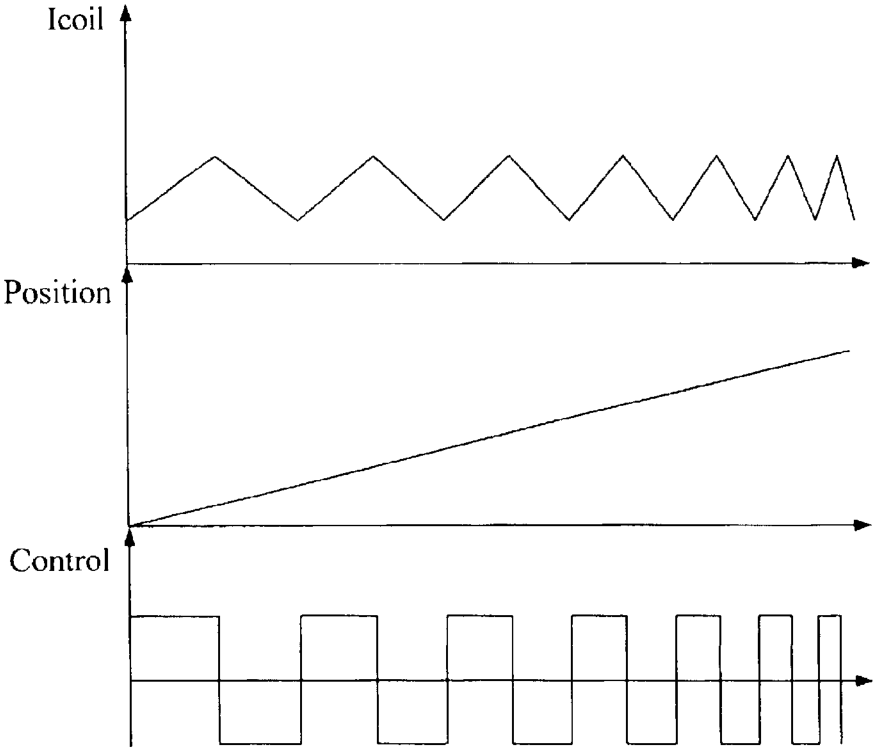
FIG. 3 is a coil current vs. time, position vs. time, and control signal vs. time diagram for an actuator during movement from its innermost to its outermost position.

The output of the comparator 14, which is indicated at point P2 in FIG. 2 forms the Control signal illustrated in FIG. 3. In addition to controlling the switching transistors Qa, Qb, the control signal is also connected as the input to a frequency-to-voltage converter 12, which will include filters (such as a low-pass or band-pass filter) as necessary to reduce or eliminate the output noise that might otherwise arise due to the harmonics in the control signal. The input frequency, and thus the output voltage, of the voltage converter 12 thus corresponds to the present value of the position of the coil. The output from the converter 12 forms not only an output signal indicating the position of the coil, but also one input to the regulator 11. This present-position voltage value may then be used as an input by any system (not shown) that requires information about the position of the coil relative to the core. The average current that is formed is thus equal to the level that is delivered by the position regulator 11 to the comparator 14.

A position set-point value is also input to the regulator 11 by any conventional circuit. The output of the regulator is therefore a function of the difference between the set-point and present position values. The regulator may be of any known type, such as a properly and conventionally scaled operational amplifier.

The amplifier 15, the comparator 14, and the arrangement of switching transistors Qa, Qb thus forms a variable frequency oscillator, whose frequency is a function of the instantaneous impedance of the coil, which in turn is a function of the position of the coil's position relative to the core.

The frequency that is measured here and that represents position will, however, also be influenced by other undesirable factors. When the pulse ratio for driving the voice coil approaches unity, the resistive characteristics of the voice coil will dominate, which will degrade the measurement. Some compensation for this may of course be implemented, but in most cases the problem can be solved by dimensioning the driving voltage and the DC resistance of the voice coil so that the pulse ratio never reaches critical levels. This may be done using known design techniques.

The movement of the voice coil will induce a back-emf, which in turn can create a short-term disturbance in the frequency of the circuit. Even this problem can be solved in most applications using known design techniques, while still using the method according to the invention. For example, this effect can be reduced or eliminated by adjusting the relationships between, for example, driving voltage, conductor diameter, and the number of windings in the voice coil.

The exemplifying embodiment above is based on an inductance-dependent oscillation where the inductance is changed by the position of the voice coil. Other solutions are also possible, however, such as allowing the actuator force to be controlled by an H-bridge, where the pulse ratio applied to the coil controls the delivered force, but with a constant frequency. The time derivative of the coil current can then be sampled, using known circuitry, whenever the H-bridge is shut off and the energy stored in the voice coil drains away. The time derivative of the current is then a measure of the inductance of the coil.

In yet another possible alternative embodiment of the invention, the current of the voice coil is controlled by an applied DC voltage, which will control the amount of force generated by the actuator. A sinusoidal alternating voltage having a constant amplitude may then be superimposed on the driving voltage signal. The phase shift between the alternating voltage and the alternating current that is thereby formed through the voice coil can then be measured and will indicate the position of the coil.

Note that in all embodiments of the invention described above, the actuator itself is used as part of the arrangement that measures the position of the actuator; indeed, other than the measurement circuitry (for example, as shown in FIG. 2) no additional components are needed at all. In particular, no special or additional mechanical parts, such as secondary coils, are required. Moreover, it is not necessary to partition the coil, that is, divide the coil windings into separately controlled or tapped portions.

Any application of current to the windings of the coil 3, for example, as a result of the position set-point signal, will of course influence the position of the coil. This means, however, that even the alternating signal $I_{coil}$ will cause coil movement, in particular, an oscillation. In order to keep the effect of such oscillation to within acceptable, predetermined limits, lowest frequency of $I_{coil}$ should be set above the upper limit of the mechanical bandwidth of the coil 3 and the actuator arm 4. Depending on the mass properties of the coil (including windings) and arm, it may also be necessary or at least preferable to ensure that the range of frequencies of $I_{coil}$ does not include any harmonic of the resonant frequency of the moving mass. The mass properties of the moving parts of the actuator and the necessary frequency range of $I_{coil}$ and thus of the control signal may be determined for each implementation of the invention using conventional experimental and analytical methods.

If a given application has stringent demands for absolute position measurement, then variations in coil resistivity caused by changes in temperature will negatively influence the measurement results. It is in such case possible to measure the resistance by using known circuitry (which may then be included in the drive and measurement circuitry 7) to calculate the ratio of the average values of current and voltage through the voice coil, which can then in turn be used to correct the actual position value. It would also be possible to provide the voice coil with a temperature sensor (which would be connected to the drive and measurement circuitry 7 in any known way) for the same purpose, in order to sense temperature directly and compensate for resistivity changes based on the sensed temperature. The amount of compensation needed can be determined through normal calibration techniques and theoretical calculations.

It would thus be possible according to the invention to arrange the magnetic circuit differently than shown in FIG. 1. For example, the component permanent magnets and details of the core can be varied with respect to number, shape and placement. Other embodiments are also possible within the scope of the invention, in which a single permanent magnet is used to drive several different air gaps, each having a corresponding voice coil. Moreover, the electronics that are used for sensing, for example, the phase shift may be implemented in any known manner without departing from the idea of the invention. It is also not necessary for the cross section of the actuator to be circular, as is shown in the example above.

What is claimed is:

1. A method for measuring the position of an actuator comprising the following steps:

generating an alternating-current (AC) signal and applying the AC signal to a coil of the actuator, said coil being moveable relative to a magnet core of the actuator;

sensing current flow through the coil as a coil current signal;

generating a control signal as a function of the coil current signal and having a frequency corresponding to a position of the coil relative to the core;

generating the AC signal with the same frequency as the control signal; and as a function of the frequency of the control signal, generating an output position signal indicating the position of the coil.

2. A method as in claim 1, further including the following steps:

generating a regulator output signal as a function of the difference between an input position set-point signal and the output position signal; and generating the control signal as a function of the difference between the regulator output signal and the coil current signal.

3. A method as in claim 2, in which the step of generating the control signal comprises applying hysteresis to the regulator output signal before forming the difference between the regulator output signal and the coil current signal.

4. A method as in claim 1, further comprising the following steps:

measuring a temperature-induced change of resistivity of the coil;

calculating a temperature compensation factor; and adjusting the control signal by the compensation factor.

5. A method as in claim 4, in which the step of measuring the temperature-induced change comprises measuring the temperature of the coil.

6. A method as in claim 4, in which the following steps:

measuring the temperature-induced change comprises measuring an average value of voltage over the coil and an average value of current through the coil; and calculating the compensation factor as a predetermined function of the ratio between the average value of voltage and the average value of current.

7. An arrangement for measuring the position of an actuator, comprising:

a permanent magnet core;

a coil arranged as a voice coil to move relative to the core;

an oscillation circuit having, as a first input, an alternating-current (AC) signal corresponding to an instantaneous current flowing through the moveable coil and having, as an output, a measurement output signal that has a frequency corresponding to the position of the coil relative to the core; and a converter converting the frequency of the measurement output signal into a position output signal indicating the corresponding to the position of the coil relative to the core.

8. An arrangement as in claim 7, further comprising:

a regulator having, as a first input, a position set-point signal corresponding to a desired position of the coil; as a second input, the position output signal; and, as an output, a position difference signal;

a comparator having as a first input, the alternating-current (AC) signal; and, as an output, the measurement output signal;

a hysteresis arrangement connected between the output of the regulator and a second input of the comparator; and a switching arrangement applying current of alternating polarity to the coil at a frequency equal to the frequency of the measurement output signal.

* * * * *